United States Patent [19]

Genier

[11] Patent Number: 5,036,956

[45] Date of Patent: Aug. 6, 1991

[54] CAM ACTUATED BRAKE ASSEMBLY

[76] Inventor: Patrice L. Genier, Box 217, Cochrane Ontario, Canada, POL CIO

[21] Appl. No.: 439,160

[22] Filed: Nov. 20, 1989

[51] Int. Cl.$^5$ .......................................... B61H 13/20
[52] U.S. Cl. ................................... 188/59; 188/71.1; 188/72.6
[58] Field of Search .................. 188/59, 58, 26, 71.1, 188/72.1, 72.4, 72.7, 72.9, 72.5, 355, 73.1, 72.6; 303/2, 5

[56] References Cited

U.S. PATENT DOCUMENTS

| | | | |
|---|---|---|---|
| 2,645,313 | 7/1953 | Schaadt | 188/355 |
| 3,791,491 | 2/1974 | Tickle | 188/59 |
| 3,980,159 | 9/1976 | Baxendale | 188/72.7 |
| 4,036,329 | 7/1977 | Anderson | 188/72.9 X |
| 4,473,136 | 9/1984 | Emilsson et al. | 188/72.4 X |
| 4,923,066 | 5/1990 | Margetts | 188/71.9 X |

FOREIGN PATENT DOCUMENTS

| | | | |
|---|---|---|---|
| 0039349 | 2/1987 | Japan | 188/59 |
| 1234258 | 5/1986 | U.S.S.R. | 188/59 |

Primary Examiner—Matthew C. Graham
Attorney, Agent, or Firm—Leon Gilden

[57] ABSTRACT

An apparatus is set forth for utilization with tractor-trailer organizations wherein a rotor is mounted fixedly and rotatably with a rear axle extending longitudinally and exteriorly of a rear axle housing, wherein the rotor includes a plurality of callipers. The callipers are actuated by a master cylinder positioned adjacent the rear axle and mounted on the axle housing. A torsion bar transmits rotative force from a remotely positioned pneumatic booster cylinder to the master cylinder utilizing cam collars mounted on the torsion bar for the master cylinder and pneumatic booster assembly.

8 Claims, 3 Drawing Sheets

CAM ACTUATED BRAKE ASSEMBLY

BACKGROUND OF THE INVENTION

1. Field of the Invention

The field of invention relates to brake assemblies, and more particularly pertains to a new and improved cylinder brake assembly wherein a pneumatic hydraulic system may be retrofitted to existing tractor-trailers for enhanced stopping power afforded such organizations.

2. Description of the Prior Art

The use of various brake systems is well known in the art, particularly for use with tractor-trailer organizations, where excess load and inertia is frequently in need of enhanced stopping power. Conventional brake shoe-drum systems may become contaminated with dust and debris interiorly of the brake drum and accordingly, lessen the efficiency of such systems. While disk brake systems are known in the art, their particular application in an efficient and effective manner in coordination with a trailer organization as set forth by the instant invention has heretofore not been effectively developed. Examples of the prior art include U.S. Pat. No. 3,791,491 to Tickle wherein a railway vehicle brake arrangement utilizes a disk with opposed callipers actuated through elongate opposed lever members associated with a hydraulic actuator.

U.S. Pat. No. 3,876,043 to Francia, et al., sets forth a disk brake actuating cylinder including opposed brake applying and release pistons for imparting forces to an associated linkage to transmit force from the brake disk pads to an associated rotor.

U.S. Pat. No. 4,015,691 to Pollinger, et al., sets forth a railway vehicle disk brake arrangement utilizing a plurality of disks on an axle of a wheel in opposed relationship, wherein a reciprocating sleeve effects actuation of the pads of the disk brake system.

U.S. Pat. No. 4,019,608 to Johnson sets forth a calliper brake assembly to secure and grasp the sides of a member utilizing a pneumatic booster and link to effect such displacement.

U.S. Pat. No. 4,082,165 to Harrison sets forth a brake assembly for use with a rotor wherein opposed brake surfaces through extensive linkage arrangements effects clamping of the rotor.

As such, it may be appreciated that there is a continuing need for a new and improved cylinder brake system wherein the same addresses both the problems of effectiveness in use and simplicity of construction to enable retrofit onto existing tractor-trailers, and in this respect, the present invention substantially fulfills this need.

SUMMARY OF THE INVENTION

In view of the foregoing disadvantages inherent in the known types of brake systems now present in the prior art, the present invention provides a cylinder brake system wherein the same is operative through a pneumatic-mechanical-hydraulic system to effect actuation of one or a plurality of callipers with an associated rotor. As such, the general purpose of the present invention, which will be described subsequently in greater detail, is to provide a new and improved cylinder brake system which has all the advantages of the prior art brake systems and none of the disadvantages.

To attain this, the cylinder brake system includes a pneumatic actuator with a reciprocating link mounted therefrom cooperative with the first collar mounted in an adjustable surrounding relationship relative to a torsion rod. A second collar spaced from the first collar is structurally associated with a master cylinder link to actuate the master cylinder upon actuation of the pneumatic cylinder by an operator of a vehicle incorporating the instant invention. Spaced callipers are mounted on an associated rotor operatively associated with the vehicle axle's core directing hydraulic fluid from the master cylinder to the callipers to actuate the callipers.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved cylinder brake system which has all the advantages of the prior art brake systems and none of the disadvantages.

It is another object of the present invention to provide a new and improved cylinder brake system which may be easily and efficiently manufactured and marketed.

It is a further object of the present invention to provide a new and improved cylinder brake system which is of a durable and reliable construction.

An even further object of the present invention is to provide a new and improved cylinder brake system which is susceptible of a low cost of manufacture with regard to both materials and labor, and which accordingly is then susceptible of low prices of sale to the consuming public, thereby making such cylinder brake systems economically available to the buying public.

Still yet another object of the present invention is to provide a new and improved cylinder brake system which provides in the apparatuses and methods of the prior art some of the advantages thereof, while simultaneously overcoming some of the disadvantages normally associated therewith.

Still another object of the present invention is to provide a new and improved cylinder brake system wherein the same utilizes a pneumatic-mechanicalhydraulic system for actuation of disk brake callipers associated with a rotor.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
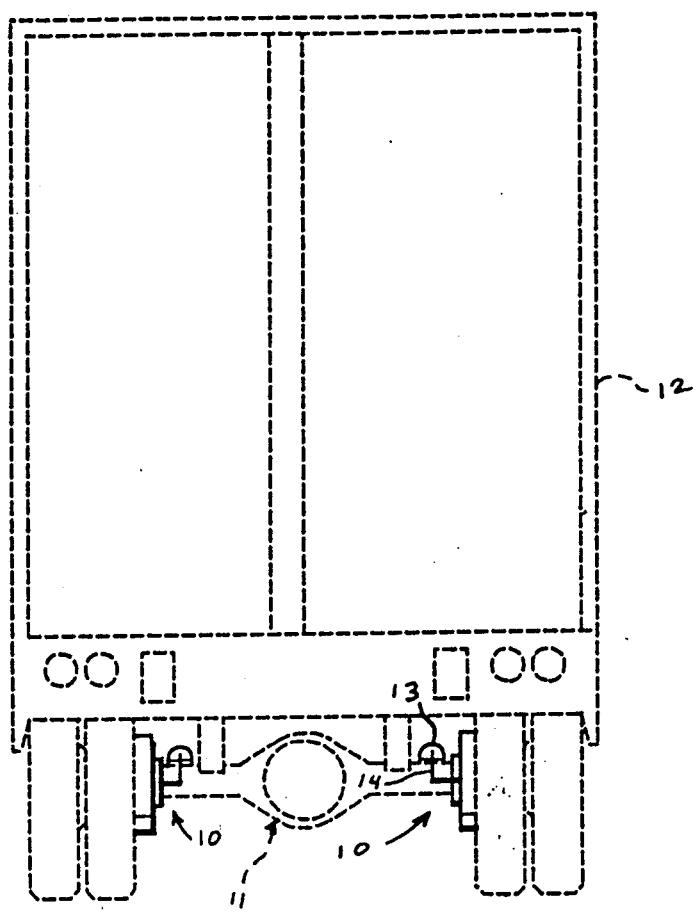
FIG. 1 is a rear orthographic view taken in elevation of the instant invention in association with a truck-trailer organization.
Figure 2:
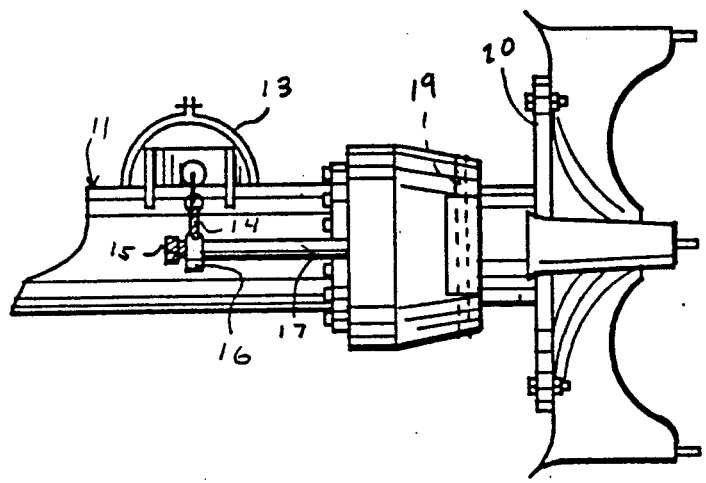
FIG. 2 is an orthographic sectional view of the instant invention in association with the truck axle.

With reference now to the drawings, and in particular to FIGS. 1 to 5 thereof, a new and improved cylinder brake system embodying the principles and concepts of the present invention and generally designated by the reference numeral 10 will be described.

More specifically, the cylinder brake system 10 essentially comprises association with a truck axle 11 mounted on a truck 12. The system is mounted adjacent the end of each axle, but for purposes of illustration only one end will be illustrated in enlarged detail as they are essentially identical in construction at each end of the axle.

The brake system includes a pneumatic booster chamber 13 fixedly mounted on an upper surface of the axle housing of the truck axle 11 of a construction, as may be found in U.S. Pat. No. 4,019,608 incorporated herein by reference. The pneumatic chamber includes a reciprocating actuator link 14 extending therefrom with a pivot connection 14a pivotally mounted to the actuator link 14 to a cam link collar 16. A slack adjuster 15 operably rotates the cam link collar 16 relative to the torsion rod 17 that the cam link collar 16 is mounted upon to reduce and minimize unwanted slack from the actuator link 14 to utilize full motion of the actuator link 14 in the actuation of a remote master cylinder 21.

Figure 3:
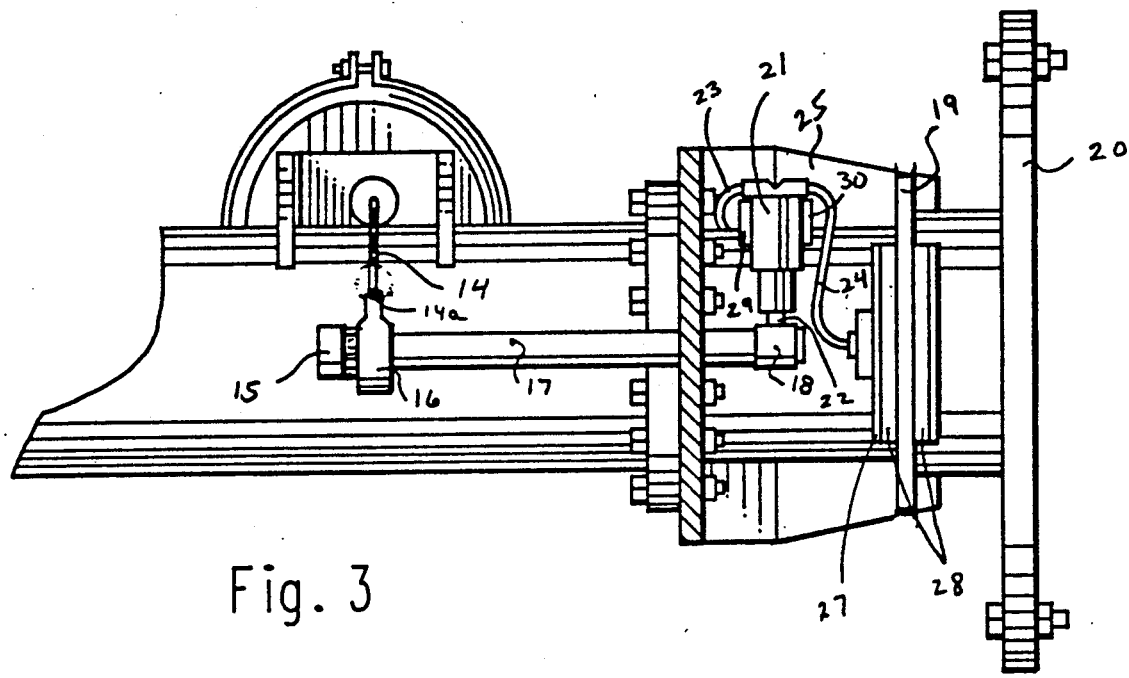
FIG. 3 is an enlarged bottom orthographic view of the instant invention in association with truck axle.
Figure 4:
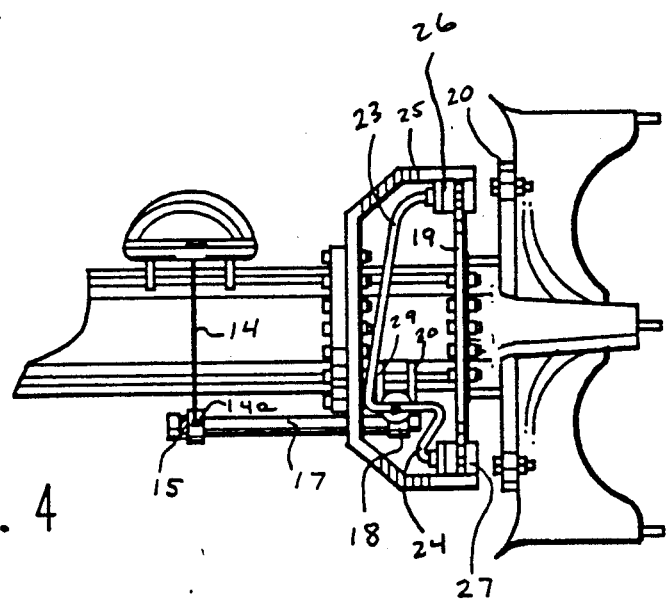
FIG. 4 is an enlarged side orthographic view taken in elevation of the instant invention associated with a truck axle.
Figure 5:
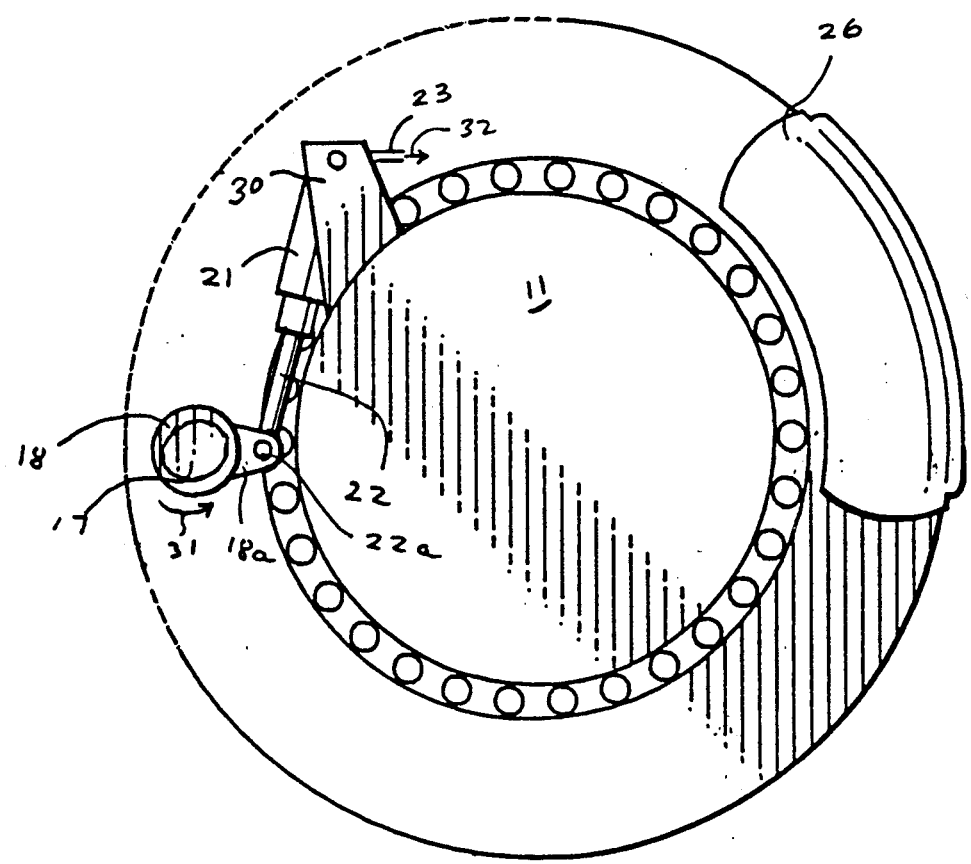
FIG. 5 is an orthographic end view partially in phantom to illustrate the mounting of the master cylinder relative to the truck axle and rotor.

The torsion rod 17 extends parallel to the truck axle housing and includes a master cylinder actuator cam 18 with a cam ear 18a extending outwardly therefrom. The cam ear 18a includes a master cylinder link 22 pivotally mounted to the cam ear at the pivot connection 22a, wherein the master cylinder link is reciprocatably mounted within a hydraulic master cylinder 21. A wheel rotor 19 is fixedly coupled to a tire mounting axle flange 20 to rotate therewith, whereupon actuation of a remote brake pedal, as typically utilized in a truck-trailer organization, the pneumatic booster chamber 13 is actuated, whereupon the actuator link 14 rotates the torsion rod 17 and reciprocates the master cylinder link 22 interiorly of the hydraulic master cylinder to actuate a first and second calliper 26 and 27 respectively mounted upon a hollow shield housing 25 to protect the various components, such as the disk brakes, the fluid lines, and the callipers from debris and road hazards, as illustrated in FIGS. 3 and 4 for example. The first and second callipers 26 and 27 are coupled by a first and second master cylinder hydraulic line 23 and 24 respectively to actuate the first and second callipers 26 and 27. Upon such actuation, the calliper brake shoes 28 reciprocatably mounted within the callipers grip the rotating rotor 19 to effect stopping thereof along with the associated axle of the truck axle organization 11. The hydraulic master cylinder 21 utilizes spaced mounting plates comprising a first mounting plate 29 and second mounting plate 30, arranged parallel to one another integrally mounted to an exterior surface of the axle housing interiorly of the hollow housing shield 25. The reference to FIG. 5 illustrates the rotation 31 of the torsion rod 18 to effect ultimate directing of hydraulic fluid from the associated hydraulic output line, as indicated by the arrow 32, to an associated calliper 26, as illustrated in FIG. 5.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A cylinder brake system apparatus in combination with an axle housing of a vehicle, wherein the axle housing includes at least one axle rotatably mounted therewithin and extending beyond each end portion of the axle housing, the apparatus comprising, a pneumatic chamber member fixedly mounted adjacent each end portion of the axle housing and including a first actuator link reciprocatably mounted therefrom, the first actuator link operably coupled a remote hydraulic cylinder, a rotor fixedly mounted to each axle includes at lease one calliper operably mounted to the rotor, a master cylinder including a conduit to actuate the calliper upon actuation of the master cylinder.

2. A cylinder brake system apparatus as set forth in claim 1 wherein the first actuator link is pivotally mounted to an elongate torsion rod, and a second link pivotally mounted to the torsion rod remote from the first link is reciprocatably mounted interiorly of the master cylinder to actuate the master cylinder upon actuation of the first link.

3. A cylinder brake system apparatus as set forth in claim 2 wherein the first actuator link is mounted to the torsion rod including a cam collar with a remote end of the first link pivotally mounted to the cam collar, the cam collar adjustably mounted relative to the torsion rod including a slack adjuster to rotatably mount the cam collar relative to the torsion rod to minimize free play of the first link relative to the torsion rod.

4. A cylinder brake system apparatus as set forth in claim 3 wherein the second link is mounted at a second link free end remote from the master cylinder to a second cam collar fixedly mounted adjacent a remote end of the torsion rod spaced from the cam collar, wherein the second cam collar includes an ear member extending exteriorly of the collar to enhance mechanical advantage directed to the second link upon rotation of the torsion rod by the first link.

5. A cylinder brake system apparatus as set forth in claim 4 wherein a hollow housing encompasses the at least one calliper, the master cylinder, and the rotor to protect the rotor, the master cylinder, and the calliper from inadvertent damage.

6. A cylinder brake system apparatus as set forth in claim 5 wherein the master cylinder includes a first plate spaced from and parallel to a second plate, wherein the first and second plates are each integrally mounted to the master cylinder at one edge portion of each plate and are fixedly mounted to the axle housing at second edge portions of each plate.

7. A cylinder brake system apparatus as set forth in claim 6 wherein the at least one calliper includes a further calliper diametrically opposed to and spaced from the first calliper to enhance selective rotative arresting of the rotor during rotation of the rotor.

8. A cylinder brake system apparatus as set forth in claim 7 including an individual hydraulic conduit directed from the master cylinder to each calliper.

* * * * *